United States Patent [19]

Xander

[11] Patent Number: 4,462,418

[45] Date of Patent: Jul. 31, 1984

[54] UNITIZED PNEUMATIC CYCLING AND TIMING SYSTEM

[75] Inventor: Thomas G. Xander, Corry, Pa.

[73] Assignee: The Al Xander Co., Inc., Corry, Pa.

[21] Appl. No.: 352,094

[22] Filed: Feb. 25, 1982

[51] Int. Cl.³ .............................................. F16K 11/06

[52] U.S. Cl. ................................ 137/106; 137/624.14

[58] Field of Search ................... 137/102, 107, 624.14, 137/119, 106

[56] References Cited

U.S. PATENT DOCUMENTS

| | | | |
|---|---|---|---|
| 3,530,890 | 9/1970 | Bird | 137/624.14 |
| 3,653,393 | 4/1972 | Love | 137/102 |
| 3,942,518 | 3/1976 | Tenteris | 137/624.14 |
| 4,046,898 | 12/1977 | Petersen | 137/624.14 X |

OTHER PUBLICATIONS

Clippard Instrument Laboratory, Inc.; Catalog: "Minimatic Modular Components", Catalog No. 477; pp. 15 and 33.

*Primary Examiner*—Alan Cohan
*Attorney, Agent, or Firm*—Kent E. Baldauf

[57] ABSTRACT

A pneumatically energized, pre-packaged, unit for selectively controlling the pressure, cycle and time duration of an air actuated work device includes a protective housing having an air pressure regulator, an air inlet orifice and a visably exposed pressure gauge adapted to communicate with an external source of pressurized air. The housing also contains a pair of three-way time delay valves and auxillary volume chambers, with integral time delay adjustment knobs protruding above the top surface of the housing. Also contained within the housing is a four-way valve means, either of the single or double piloted type, which is pneumatically piped, either in a parallel or series circuit array, to the three-way time delay valves and the air pressure regulator. The four-way valve means includes first and second air outlet ports which are connected to a pair of air outlet orifices mounted on the exterior of the housing, which, in turn, are adapted to be connected to the air supply lines of a remotely located, pneumatic work device. When the external, pressurized, air supply is activated, the four-way valve delivers air to the work device at a predetermined pressure by adjustment of a pressure regulator knob positioned on the housing adjacent to the pressure gauge. The pressurized air is also delivered to the work device at a predetermined cycle and duration by selective rotation of the time delay adjustment knobs of the three-way valves.

3 Claims, 4 Drawing Figures

UNITIZED PNEUMATIC CYCLING AND TIMING SYSTEM

BACKGROUND OF THE INVENTION

This invention relates to control devices and more particularly to a pneumatic control unit for selectively directing the operating pressure, cycle and work function duration of a pneumatic work device. Pneumatic work devices, most commonly air actuated pistons, find many light to moderate industrial applications, such as in the holding, moving, indexing, piercing and pressing of a work piece or in the indexing and actuation of the tools and fixtures or machines which perform manufacturing functions on the work piece itself.

It is common in such industrial applications, to perform various manufacturing operations on a given work piece or on a given machine in a timed, cyclic manner. In automatic or semi-automatic machines it is essential that the workpiece be precisely indexed to its proper work station at the proper time and that any machine functions operating on the work piece at a given work station such as hold downs, air blasts, tools or the like be also precisely cycled to perform their intended tasks for a prescribed duration of time.

With this in mind, it it thus necessary to utilize control devices which are either timed or which physically sense the movement of the work piece, machine, tool or the like so as to achieve satisfactory operation. Heretofore, it has been common to use air actuated pistons for various industrial functions, as alluded to above, and to control the cycling and timing or duration of their work functions by use of electrically actuated limit switches and timers which open and close electric solenoid valves to control the air flow in the given system. These prior control systems have certain inherent shortcomings since they rely upon mechanically accuated limit switches which may malfunction due to fouling, misadjustment or machine vibration. In addition, these devices require electricity and, in certain plant locations, this may prove burdensome and expensive to wire or even dangerous, if there is a fire or explosion danger, due to electrical sparking, in a given location.

In order to overcome these shortcomings, it has been recognized in the past that it is desirable, when and where possible, to do away with the aforementioned electrical limit switches and solenoid valves and, in their place, utilize pneumatic control devices exclusively.

In an effort to meet this need, as well as others, the pneumatic control industry has developed numerous types and sizes of air flow control valves which are designed to perform various functions such as automatic cycling and timing in connection with pneumatic work systems.

For example, it has heretofore been recognized that a pair of three-way, time delay valves when piped in a series pneumatic circuit and directly piped to a spring loaded work piston could function as an automatic cycler. It has further been recognized that the duration of the cycle of the work piston could be varied by adjusting the timing controls on the three-way valves and that the time delay could be further increased by the addition of volume chambers to the circuit.

Another known pneumatic cycling arrangement utilizes two three-way valves, without the time delay feature, piped in a parallel pneumatic circuit to a double piloted, four-way valve. The air output from the four-way valve is piped to a double acting work cylinder with a reciprocating piston. This circuit permits reciprocal movement of the piston without the use of limit switches or valves and controls the piston speed by restricting the air exhausting from the four-way valve.

While these aforementioned, known pneumatic circuits do produce an automatic cycling function, they also have some inherent shortcomings. For example, in the series pneumatic circuit arrangement, first mentioned above, one of the three way time delay valves is piped directly to the work device and the work device thus becomes part of the pneumatic circuit. The work device is a single acting cylinder having a spring loaded piston to achieve retraction thereof so as to permit the work cylinder to exhaust through the three-way valve. Hence, the cycling of the work device is dependent to a great extent upon the spring return of the work cylinder's piston which could pose problems where true cycle duration and constant length of extension and retraction of the piston stroke are necessary. In addition, this prior circuit has only one air output to the work device which, necessarily, limits its usefulness.

The known parallel pneumatic circuit mentioned above, likewise, lacks certain desirable features which renders it somewhat deficient in situations where an adjustable range of cycle times is sought. In this prior circuit, the three-way valves have no adjustable time delay knobs to enable the user to pre-select the timing in actuating of the four-way valve. Time delay is merely pre-set at one valve, for a given air line pressure, by the size of the restricted exhaust orifices in the four-way valve. Further, this prior known parallel circuit makes no use of auxiliary volume chambers which further reduces the potential for achieving longer cycle times.

In addition to the several deficiencies noted above relating to the functioning of prior, known parallel and series pneumatic cycling circuits, there are also other shortcomings present in the prior art envolving the layout and use of pneumatic controls and circuits in general. In many instances, an industrial user of pneumatic devices designs and builds his own pneumatic control system. In most cases, the pneumatic control devices, valves, regulators, and gauges are mounted on a board or table or along in-plant air lines, uncovered and sometimes distantly spaced from other pneumatic circuit components. This common layout practice envolving pneumatic control circuits not only leads to awkward timing and fine tuning of the system, but it also may lead to premature component failure because the parts are physically exposed to the plant environment and could be accidentally damaged by workers or generally degraded by dirt and dust present in the plant.

SUMMARY OF THE PRESENT INVENTION

The present invention overcomes many of the problems encountered with prior pneumatic cycling systems by providing a compact unit having all of its control devices and circuit piping mounted within a protective housing.

The pneumatic cycling and timing unit of the present invention provides a compact pneumatic circuit requiring only one input air supply and yields accurate cycling of repeatable duration over an adjustably wide range of time delays. The single input of air not only provides the power to run the external work device but also functions to motivate the timing portion of the circuit.

The pneumatic cycling and timing system of the present invention further provides a unitized package which conveniently permits the regulation of the working air pressure as well as the pre-selection and fine tuning of the timing and duration of the work cycle by movement of control knobs mounted on the housing.

The present invention, when piped in a series circuit, provides a safer cycling system which will always return the work cylinder to its starting position if, for any reason, the input air supply is halted.

The pneumatic cycling and timing unit of the present invention still further provides a control station which eliminates the need for solenoid valves, electric timers and limit switches and, hence, reduces overall costs as well as the need for electricity and attendent wiring costs. Since the present invention utilizes no electricity, it presents no shock or spark hazard and, thus, can be used in damp areas or in locations where explosion-proof components are required.

Further, the present invention provides a pneumatic cycling unit enclosed by a compact housing having a single detachable air input orifice and two detachable air outlet orifices which saves plant space while lending a portability feature to the unit in that it may be moved easily whenever and wherever desied.

The pneumatic cycling and timing unit of the present invention still further provides a system which delivers a constant air pressure to the work device even if the plant air fluctuates upstream from the unit. In addition, the invention provides an enclosed pneumatic cycling system which is protected by its housing from direct physical contact and from plant contaminents thus affording reliable performance and greater longevity. Since the unitized control system of the present invention is pre-assembled and packaged, it reduces plant time and costs which would be incurred for piping, installation and maintenance.

The pneumatic cycling and timing unit of the present invention achieves these desirable features by providing a housing having an air inlet orifice, which is adapted to be connected to an external air supply, and two air outlet orifices which are adapted to be connected to the air lines of a remotely located, pneumatic work device. The housing contains an air pressure regulator with its adjustment knob and pressure gauge positioned on the upper surface of the housing for easy adjustment and visual inspection of the working air pressure. The housing also contains a pair of three-way time delay valves and auxillary volume chambers with integral time delay adjustment knobs extending above the top surface of the housing. A four-way valve means, either single or double piloted, is also mounted within the housing and is pneumatically piped in either a series or parallel circuit array (depending upon the type of four-way valve employed) to the three-way valves and the air pressure regulator. When the external air supply is activated, the four-way valve delivers air to the work device through one of its output ports at a pre-selected line pressure by adjustment of the pressure regulator knob and at a predetermined cycle and working duration by selective rotation of the time delay adjustment knobs of the three-way valves. The three-way valves operate as the timing elements of the cycling circuit and after a predetermined time interval elapses, one of the three-way valves shifts the air emitting from the four-way valve from its first outlet to its second outlet causing the work device to cycle. The other three-way valve then shifts after a predetermined time delay to exhaust the unit and begin the cycle anew.

DETAILED DESCRIPTION OF THE INVENTION

Figure 1:
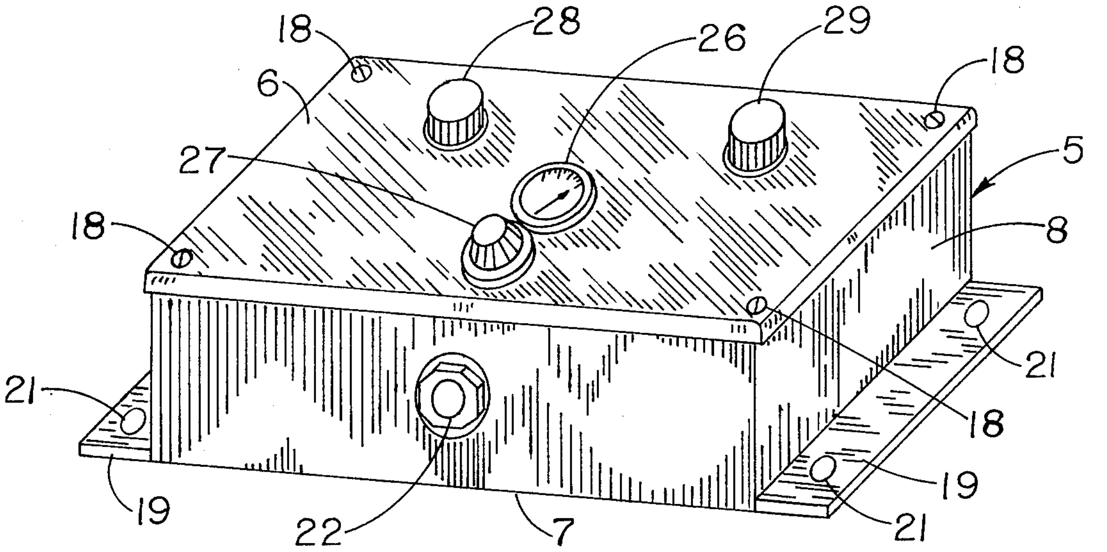
FIG. 1 is an isometric front view of a housing of the present invention.
Figure 3:
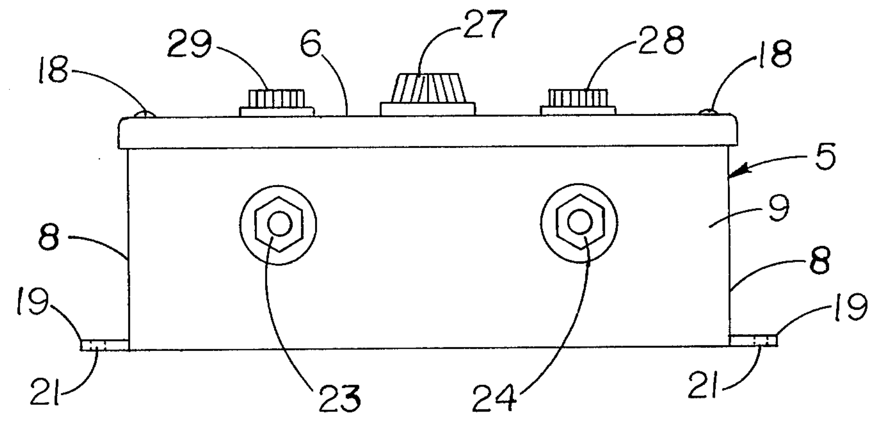
FIG. 3 is a side elevational view of the rear surface of the housing shown in FIG. 1.

Referring now, more specifically, to the drawings and in particular FIGS. 1 and 3, a pneumatic cycling and timing unit embodying the features of the present invention is depicted in an assembled state with a housing 5 forming a closure which contains all of the pneumatic controls therewithin. The housing 5 is constructed of a shock resistant material, preferably metal or high impact plastic. The housing 5 comprises a front surface 7, a rear surface 9 and side surfaces 8. Each of the sides 8 of the housing 5 have an outwardly extending mounting flange 19 for securing the unit to a work surface. The flanges 19 have bolt holes 21 formed therethrough for this purpose. The upper surface 6 is detachably secured to the hoiusing 5 by way of screws 18. The compact housing 5 measures ten inches long, eight inches wide and four and one quarter inches high.

The upper surface 6 has four cutout portions formed therethrough to permit the protrusion of an air pressure regulator adjustment knob 27, a pressure gauge 26 and a pair of time delay adjustment knobs 28 and 29, the functions of which will be explained in greater detail hereinafter.

Figure 2:
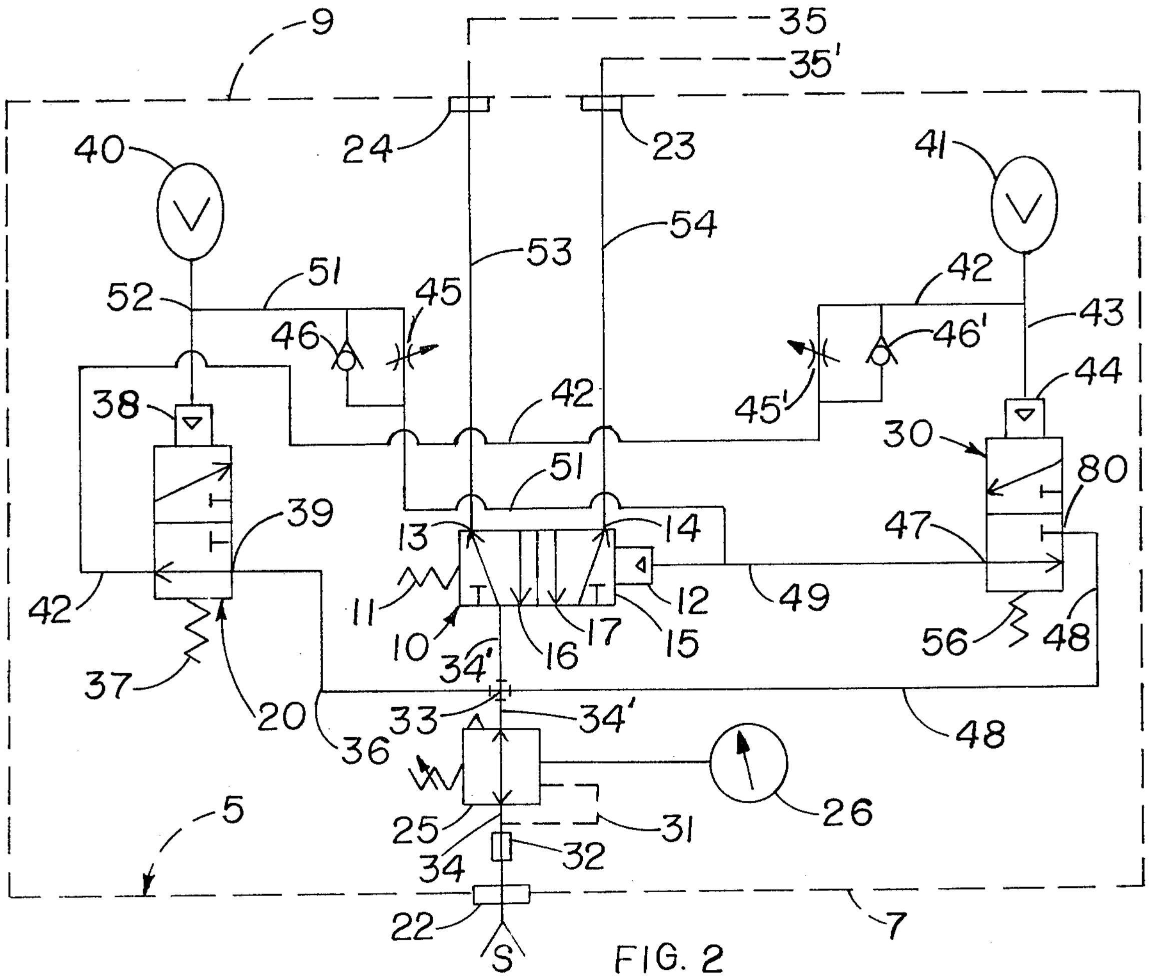
FIG. 2 is a schematic drawing of the pneumatic components depicted in a series circuit array.
Figure 4:
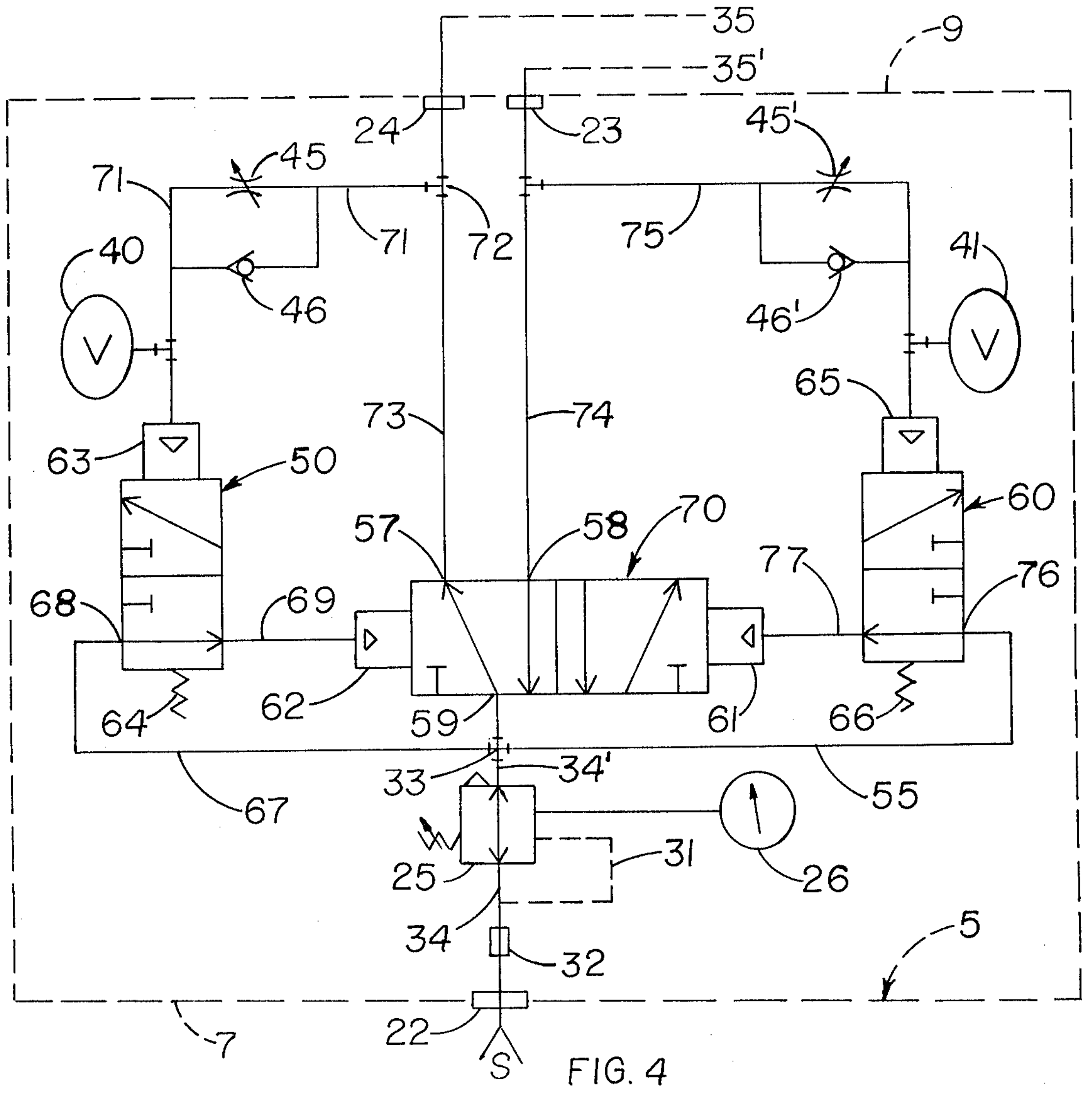
FIG. 4 is a schematic drawing similar to FIG. 3 showing a parallel pneumatic circuit array.

The front surface 7 of the housing 5 has an air inlet orifice 22 mounted therein which is adapted to be connected to an external source of pressurized air, said source being designated by the letter "S" in FIGS. 2 and 4. The rear surface 9 of the housing 5 contains a pair of air outlet orifices 23 and 24 which are adapted to be connected to the external air lines 35 and 35' of a remotely located, pneumatic work device such as a cylinder, air motor, valve or the like (not shown).

Assembled within the housing 5 are various pneumatic components and air lines which, when activated by the external air supply "S", effect the automatic cycling and timing functions of the present invention. A presently preferred embodiment of a cycling circuit with associated pneumatic components is shown in FIG. 2, wherein the timing valves 20 and 30 are connected in a series pneumatic circuit. Within the housing 5, the air inlet orifice 22 is connected to an air regulator 25 by way of an air line 34. Positioned between the orifice 22 and regulator 25 is an air filter cartridge 32 which will enhance the air quality entering the system by entrapping foreign matter which may be present in the external air supply "S".

It should be noted, before a detailed description of the pneumatic circuits is given, that all of the symbols shown of FIGS. 2 and 4 identifying the various pnematic components are symbols adopted by the American National Standards Institute of ANSI as it is also known.

Still referring to FIG. 2, the air pressure regulator 25 is a commercially standard model having an air vent 31 with a range of from 0 to 120 psi (pounds per square inch) in order to handle the normal working air pressure encountered in most industrial plants which is commonly between about 60 psi and 100 psi. An air pressure guage 26 is connected to the regulator 25 and it, likewise, has a dial range of 0–120 psi.

The pressure of air flowing through the regulator 25 is predetermined by rotation of the regulator adjustment knob 27 and by visual inspection of the pressure gauge 26 on the exterior of the housing 5. This selected pressure will be the same as the external output pressure transmitted through the air lines 35 and 35′ to the remotely located pneumatic work device.

Input air flows through the regulator 25 through a fitting 33 and, thence, through three circuit branches 36, 34′ and 48. Air line 34′ is connected to the input port of a four-way, single piloted, spring return valve 10. valve 10 is a commercially available item and comprises a pilot portion 12, a body 15 and a spring return 11. The arrows shown in the body 15 indicate a first air outlet port 13 and a second outlet port 14 and first and second air exhaust ports 16 and 17, respectively. In the starting position, air passes through line 34′ and valve 10 exiting through port 13 and air line 53 to outlet orifice 24.

After the four-way valve 10 has been shifted by pilot 12, as will be explained hereinafter, the external air is shut off at outlet port 13 and shifted to the second outlet port 14, air line 54, through orifice 23 and external air line 35′ to the work device. When this shifting occurs, the air pressure in line 53 is exhausted through port 16 of valve 10. Conversely, when the valve 10 shifts to its starting position with the aid of the spring 11, the air in line 54 is exhausted through port 17 of the four-way valve 10.

The automatic cycling and cycle duration of the four-way valve 10 is attained by the valves 20 and 30, which, as previously stated, are connected in a series timing circuit. Air at a pre-selected pressure passes through fitting 33 and the branch air line 36 to the valve 20, which is a three-way time delay valve with a spring return 37 and a single pilot 38. The valve 20 is a standard commercial item and is available from suppliers such as Clippard Instrument Laboratories, Inc., Kay Pneumatics, and CompAir Company. The three-way valve 20 is normally open and permits the air in line 36 to pass through port 39 to air line 42 which is connected to the pilot 44 of the valve 30. The valve 30, like valve 20, is also a three-way time delay valve having a pilot section 44 and a spring return 56. Valve 30 differs in one respect from the valve 20 in that it is connected such that it is normally closed, as indicated by the arrow designated 47. Thus, at start-up, regulated air passes through the fitting 33 and through a branch air line 48 until it is blocked by the valve 30 at a port 80. When the valve 30 is shifted by the pilot 44, the blocked air is redirected through valve 30 to the air line 49.

Now that each of the valves 10, 20 and 30 have been described individually, an overall description of the functioning of the series circuit shown in FIG. 2 will be given. The external air supply "S" is attached to the inlet orifice 22 and regulated to a desired pressure level by rotation of the knob 27 of the regulator 25 and read on the gauge 26. At start-up, air passes through the four-way valve 10 through the outlet 13, the air line 53 and outlet orifice 24 to the work device by way of air line 35. Also at start-up, air is present in line 48 but is blocked by the port 80 of the three-way valve 30. At the same time, regulated air passes through the air line 36 and through the normally open port 39 of the three-way valve 20 to air line 42 and the air line 43 which is connected to the pilot section 44 of the valve 30. The air pressure on the pilot 44 then shifts the valve 30 to unblock line 48 causing air to flow through port 47 and air line 49 to the pilot 12 of the four-way valve 10. When this occurs, valve 10 shifts and the air output from valve 10 shifts from the outlet port 13 to the output port 14 thence, through the line 54, the outlet orifice 23 to the work device by way of the external air line 35′.

While valve 10 is being piloted by the air in line 49, air also is flowing in line 51 which is connected to the air line 49. Air in the line 51 passes through an air line 52 to the pilot section 38 of the three-way valve 20 which causes the valve 20 to shift and block the flow of air through the line 42 to the pilot 44 of the valve 30. When this occurs, the system pressure exhausts to a point where the spring 56 shifts the valve 30 to its starting position whereby air in the line 48 is, once again, blocked by the port 80. Since the line pressure is removed from the air line 49, pressure is removed from the pilot 12 of the four-way valve 10 thus permitting the spring 11 to shift the air back to the original outlet port 13. For the same reason, air pressure is relieved from the line 51 and the pilot 38 of the three-way valve 20 which then shifts to its original position by the spring 37 and the cycle is ready to begin again.

In order to achieve adjustability to the time delay function of the circuit, the three-way valves 20 and 30 have adjustable time delay controls associated therewith. The time delay control is part of the valve as a commercial item and is depicted in the drawing as adjustable flow controls 45 and 45′, which selectively restrict the flow or volume of air passing therethrough. The time delay flow controls 45 and 45′ may be adjusted from an open position to a closed position by rotation of the time delay adjustment knobs 28 and 29 which control the air flow into the pilot section 38 of the valve 20 and the air flow into the pilot section 44 of the valve 30, respectively. Also forming a part of the time delay control circuit are one-way ball valves or check valves 46 and 46′ which permit air to flow only through the flow controls 45 and 45′ when the air path is directed toward the pilot sections 38 and 44. When the air path is reversed in the exhaust mode, the valves 46 and 46′ open to permit the exhaust air to bypass the restricted flow controls 45 and 45′, thus permitting a quicker exhaust through the lines 42 and 51.

In order to obtain faster and more responsive fine tuning of the timing portion of the pneumatic circuit and to provide higher air volume flowing to the work device, it is preferred to have the timing circuit air lines 36, 42, 43, 48, 49, 51 and 52 of a smaller diameter than outlet air lines 53 and 54. In this regard, I prefer an inside diameter of $\frac{1}{8}$ inch and an outside diameter of $\frac{1}{4}$ inch for the air lines of the timing circuit and an inside diameter of $\frac{1}{4}$ inch and an outside diameter of $\frac{3}{8}$ inch for the outlet air lines 53 and 54.

In order to attain greater time delays in cycling the four-way valve 10, volume chambers 40 and 41 are provided in the circuit. Volume chamber 40 is connected to the air line 51 and to the pilot section 38 of the three-way valve 20 by way of an air line 52. Likewise, volume chamber 41 is connected to the air line 42 and to the pilot section 44 of the valve 30 by way of an air line 43. The volume chambers 40 and 41 are small air tanks, approximately four inches in length and about two and one half inches in width at their greatest diameter. The volume chambers 40 and 41 are preferably constructed of stainless steel but could also be of rubber or other material which can contain pressurized air and which is corrosion resistant. The volume chambers 40 and 41 hold additional air within their interiors at the preselected line pressure and since they are connected to the air lines 42 and 51 piloting three-way valves 20 and 30, respectively, they must be filled before a valve pilot will shift the valve and, conversely, they must also be exhausted before the springs 37 and 56 shift the valves back to their starting positions. Without the volume chambers 40 and 41, the three-way valves 20 and 30 are capable of achieving a cycle time delay range of between 0–15 seconds. The time delay range is extended to 0–30 seconds when the volume chambers are added to the circuit which greatly enhances the usefulness of the present invention. The time delay adjustment knob 28 can be rotated to restrict the air flow through the flow control 45 which, necessarily, restricts the air flow through lines 51 and 52 to the pilot section 38 of the three-way valve 20. By restricting the air flow to the pilot 38, the time duration for which valves 30 and 10 are shifted and emitting air through outlet ports 47 and 14 is increased. Conversly, if time delay adjustment knob 29 is rotated to restrict the air flow through the flow control 45' on air line 42, the piloting of three-way valve 30 is delayed which increases the time duration for air emitting from the outlet port 13 of the four-way valve 10. It can, therefore, be seen that a wide variety of cycle and duration times can be obtained by the fine tuning of adjustment knobs 28 and 29 between their fully open and closed positions.

Referring now to FIG. 4, another presently preferred embodiment of the invention is shown, wherein the pneumatic control components are connected in a parallel circuit array. This embodiment also comprises components which are contained within the protective housing 5 along with the single air inlet orifice 22 and the outlet orifices 23 and 24. The housing 5 also contains an air line filter cartridge 32, the air pressure regulator 25 and associated pressure gauge 26 as well as the time delay adjustment knobs 28 and 29 and the pressure regulator adjustment knob 27.

The four-way valve 70 shown in FIG. 4 is a double-piloted type having a pilot section 62 on the left and a pilot section 61 on the right. Air enters the valve 70 at a port 59 and exits at a first valve outlet port 57 when the valve 70 is shifted to the right by the pilot 62. In this position, air at regulated pressure passes through an air line 73 to the outlet orifice 24 and, thence, passes to the external work device through the air line 35.

When the four-way valve 70 is shifted to the left by the pilot 61, incoming air is shifted to a second outlet port 58 which then passes air through a line 74, outlet orifice 23 and thence to the work device by way of the air line 35'. The cyclic shifting of the four-way valve 70 is accomplished by two identical three-way time delay valves 50 and 60. Valve 50 has a pilot section 63 and a spring return 64 and is connected to an air line 67 at a port 68 in a normally open fashion such that it is normally passing air through a line 69 to the pilot 62 of the four-way valve 70. Air passing through the line 73 from the first outlet port 57 of the four-way valve 70 is "T"-ed off at a fitting 72 and passes to the pilot 63 of the valve 50 by way of air line 71. When the air at pilot 63 causes the valve 50 to shift, the valve inlet port 68 becomes blocked, thus exhausting the pressure on the pilot 62 which permits the air in line 55 to pass through the other three-way valve 60 at a port 76 to a line 77 to the pilot 67 of valve 70 which causes the four-way valve 70 to shift to the left and divert its output air to the port 58. At this point, air passes through a line 75 which is "T"-ed to the air line 74 and thence to the pilot section 65 of the three-way valve 60. When the air pressure on pilot 65 is sufficient, valve 60 shifts to block the flow of air through line 77 to the pilot 61 of the valve 70. At this point, there is insufficient pressure to hold down the pilot 63 of valve 50 and the spring 64 shifts valve 50 to its starting position, sending air to the pilot 62, thus causing the four-way valve 70 to shift to the right to begin the cycle once again. Because valve 70 is double piloted, faster cycling can be attained compared with the embodiment of FIG. 2.

The time delay and adjustability thereof, for the cycle obtained by the circuit shown in FIG. 4, is also achieved through the use of adjustable flow controls 45 and 45' with one-way ball valves 46 associated therewith. Additional time delay is also realized with the use of the volume chambers 40 and 41 which function in the same manner as previously described.

Having described my invention, I claim:

1. A unitized, pneumatic cycling and timing system comprising:

a. a box-shaped housing having opposed top and bottom surfaces and opposed front, rear and side surfaces;

b. an air inlet orifice mounted on a surface of the housing adapted to communicate with an external source of pressurized air;

c. an air pressure regulator positioned within the housing communicating with the air inlet orifice and including an adjustment knob on the exterior of the housing to regulate the pressure of the inlet air;

d. an air pressure gauge associated with the air pressure regulator for visually reading the regulated air pressure on an exterior surface of the housing;

e. first and second single piloted, spring return three-way time delay valves, each having volume chambers and time delay adjustment knobs associated therewith, said first and second valves being mounted within said housing and said time delay adjustment knobs mounted on an exterior surface of said housing;

f. a single piloted, spring return four-way valve mounted within the housing having first and second air outlet ports communicating with a pair of air outlet orifices mounted on an exterior surface of said housing, said outlet orifices adapted to be connected to a remotely located, air actuated work device; and g. air circuit means positioned within the housing interconnecting the air pressure regulator with said first and second three-way time delay valves and said four-way valve, whereby, when the external air supply is applied, said four-way valve sequentially emits air through the outlet orifices at a predetermined pressure by adjustment of the pressure regulator knob and at a predetermined time and duration by selective rotation of the time delay adjustment knobs of the first and second three-way time delay valves, said air circuit means comprising:

a first air line for passing pressurized inlet air from the pressure regulator to the four-way valve, said four-way valve when in an unshifted position passing said air through its first outlet port and thence through an outlet air line to the first outlet orifice on the exterior of the housing;

a second air line for passing pressurized inlet air from the pressure regulator to the first three-way time delay valve, said first three-way valve when in an unshifted position passing air to the pilot of the second three-way time delay valve;

a third air line for passing pressurized inlet air from the pressure regulator to the second three-way time delay valve which in an unshifted position blocks the air in said third air line; and a fourth air line connected to the second three-way time delay valve and adapted to communicate with the third air line when the second three-way valve is shifted, said fourth air line adapted to pass air from the second three-way valve to the pilot of the four-way valve and to the pilot of the first three-way valve, whereby pressurized air in the second air line causes the pilot of the second three-way valve to shift said second three-way valve to permit pressurized air to shfit the pilots of the four-way and the first three-way valve, whereupon the pressurized air output of the four-way valve is shifted from its first outlet port to its second outlet port and passes through an outlet air line to the second outlet orifice on the housing and the first three-way valve is shifted to block the air flow through the second air line to the pilot of the second three-way valve, causing said second three-way valve to return to its unshifted position and exhaust the circuit to begin said cycle once again.

2. The unitized, pneumatic cycling and timing system of claim 1 including an air filter cartridge mounted within the housing for filtering the external air supply prior to its entry into the pressure regulator.

3. The unitized, pneumatic cycling and timing system of claim 1 wherein the second, third and fourth air lines have an inside diameter smaller than the first air line and the outlet air lines of the four-way valve.

* * * * *